(12) United States Patent
Kumaki et al.

(10) Patent No.: US 10,819,908 B2
(45) Date of Patent: Oct. 27, 2020

(54) IMAGE SENSOR AND ELECTRONIC DEVICE HAVING THE SAME

(71) Applicant: CANON KABUSHIKI KAISHA, Tokyo (JP)

(72) Inventors: Satoshi Kumaki, Kawaguchi (JP); Hirokazu Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 47 days.

(21) Appl. No.: 16/354,933

(22) Filed: Mar. 15, 2019

(65) Prior Publication Data
US 2019/0289213 A1 Sep. 19, 2019

(30) Foreign Application Priority Data

Mar. 19, 2018 (JP) ................. 2018-051517

(51) Int. Cl.
*H04N 5/232* (2006.01)
(52) U.S. Cl.
CPC ....... *H04N 5/23254* (2013.01); *H04N 5/2327* (2013.01); *H04N 5/23258* (2013.01)
(58) Field of Classification Search
CPC ........... H04N 5/23254; H04N 5/23258; H04N 5/2327
See application file for complete search history.

(56) References Cited

U.S. PATENT DOCUMENTS

| 6,778,768 | B2 * | 8/2004 | Ohkawara | H04N 5/23248 348/208.11 |
| 2003/0198400 | A1 * | 10/2003 | Alderson | H04N 5/361 382/274 |
| 2008/0144958 | A1 * | 6/2008 | Lee | G06T 5/50 382/260 |

FOREIGN PATENT DOCUMENTS

JP 2010-193524 A 9/2010

* cited by examiner

*Primary Examiner* — Twyler L Haskins
*Assistant Examiner* — Angel L Garces-Rivera
(74) *Attorney, Agent, or Firm* — Cowan, Liebowitz & Latman, P.C.

(57) ABSTRACT

An image sensor that obtains an image in which shake is corrected, while at the same time suppresses an increase in the circuit size, is disclosed. The image sensor has a plurality of pixels. Each of the plurality of pixels includes a light-sensitive element that detects the incidence of single photons; and a counter that counts a pulse contained in a signal. The image sensor further comprises a control unit that, on the basis of detected shake, switches a signal of the light-sensitive element supplied to the counter in a pixel, or replaces a count value of the counter of the pixel with a count value of the counter in another pixel.

11 Claims, 12 Drawing Sheets

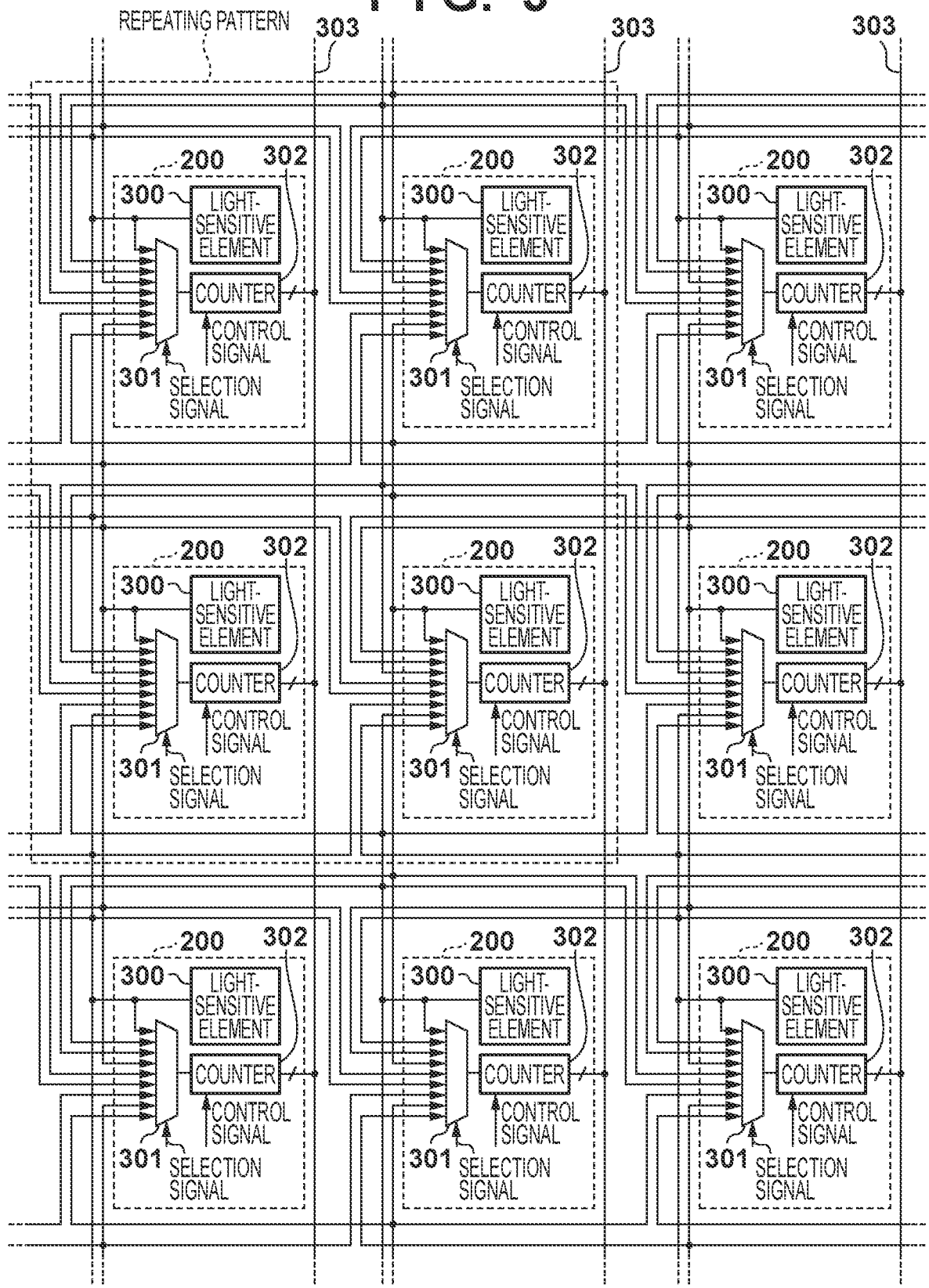

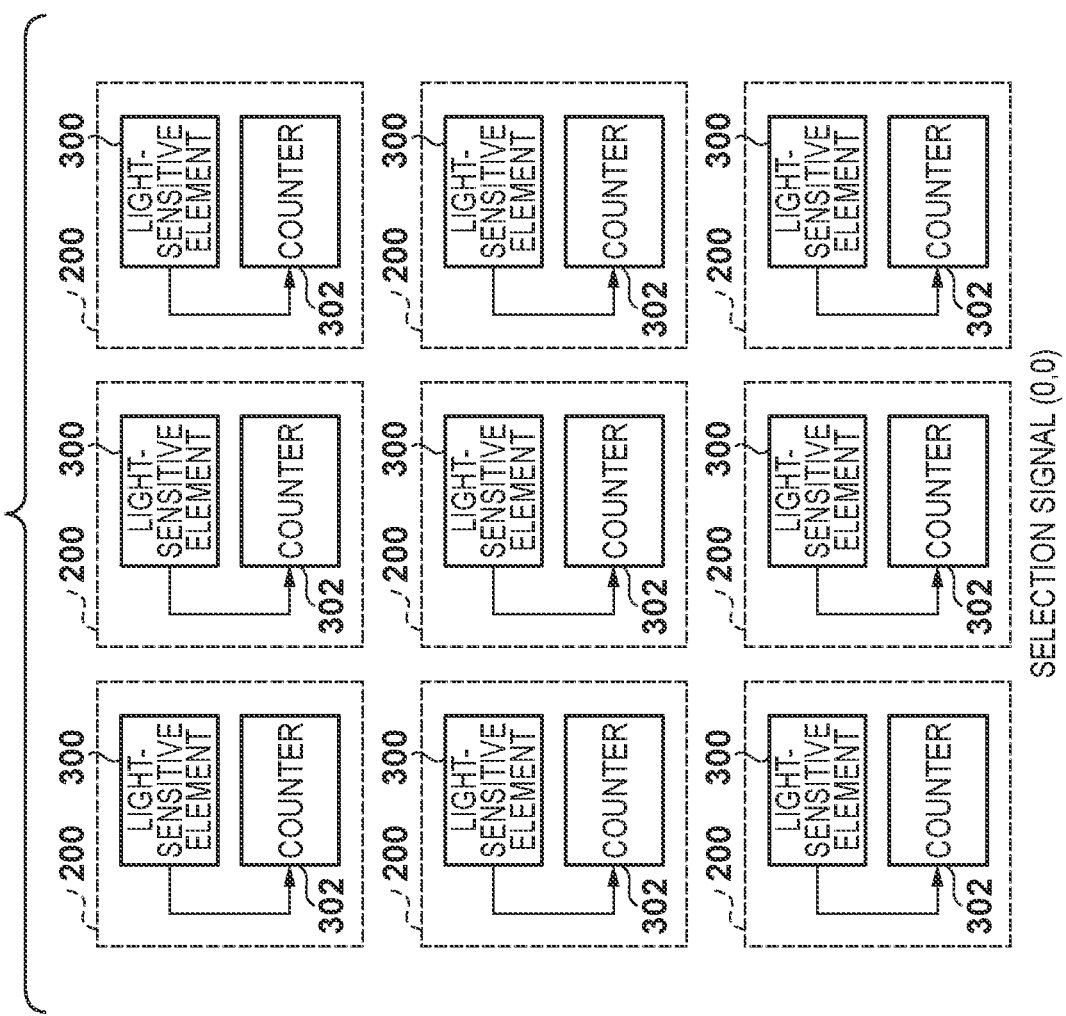
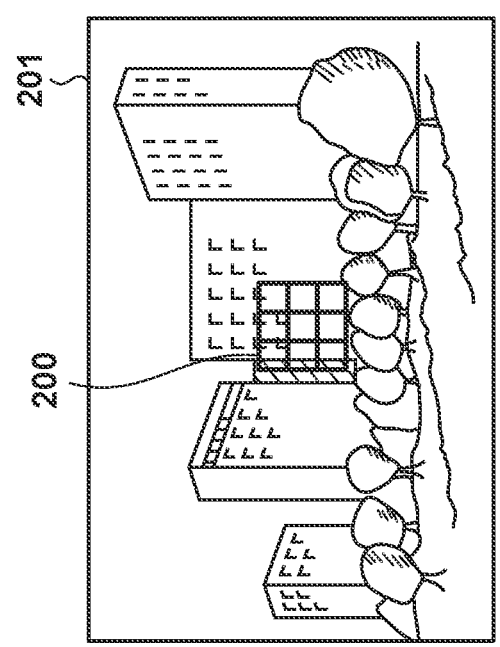

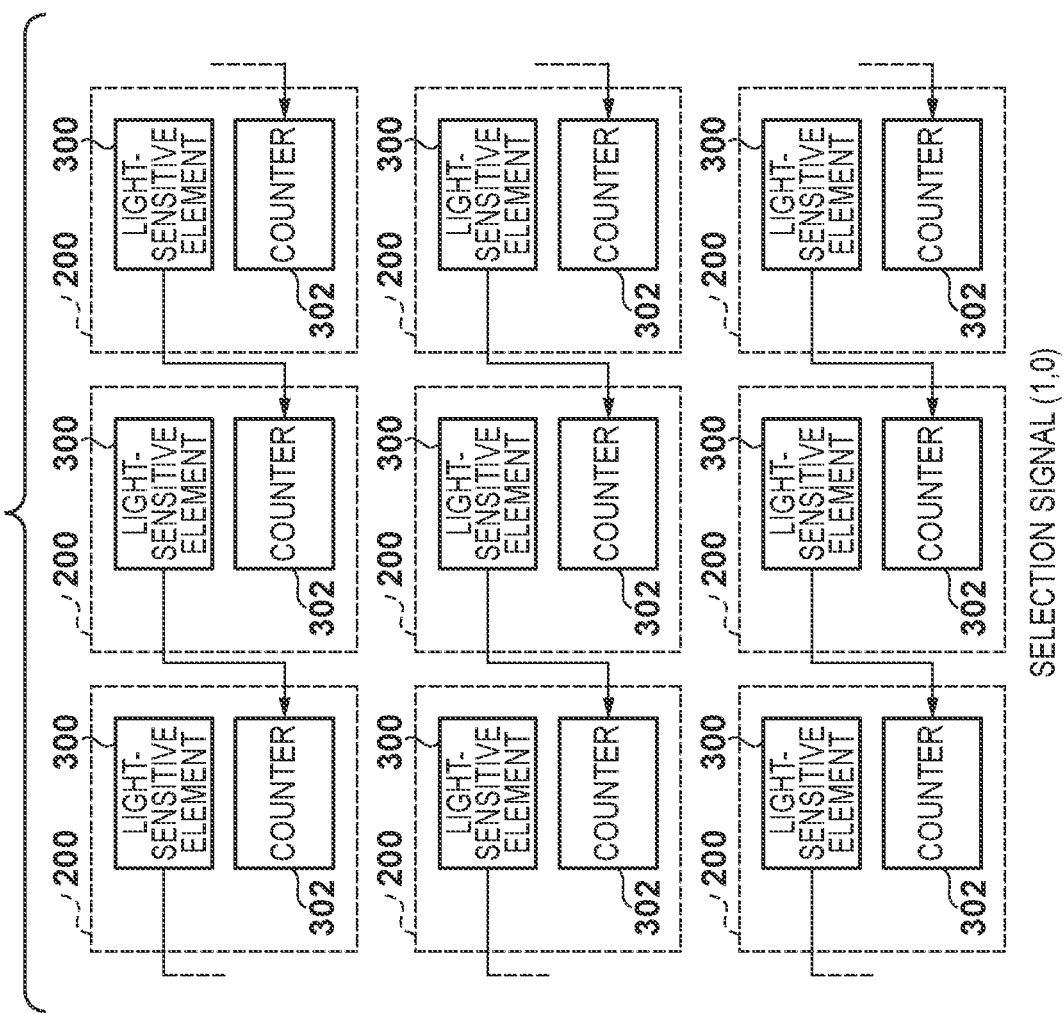
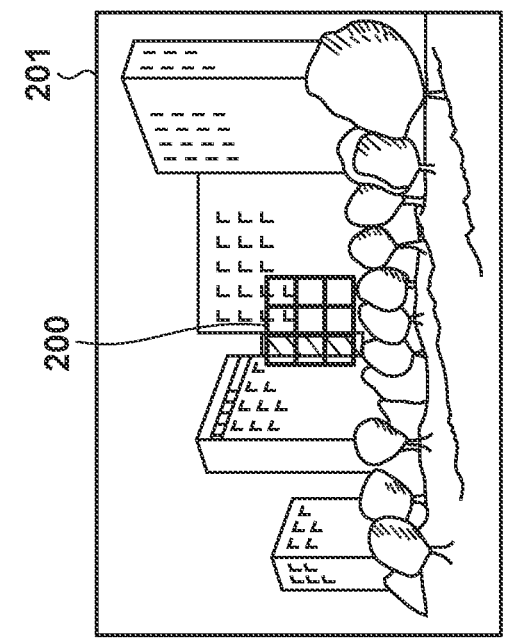

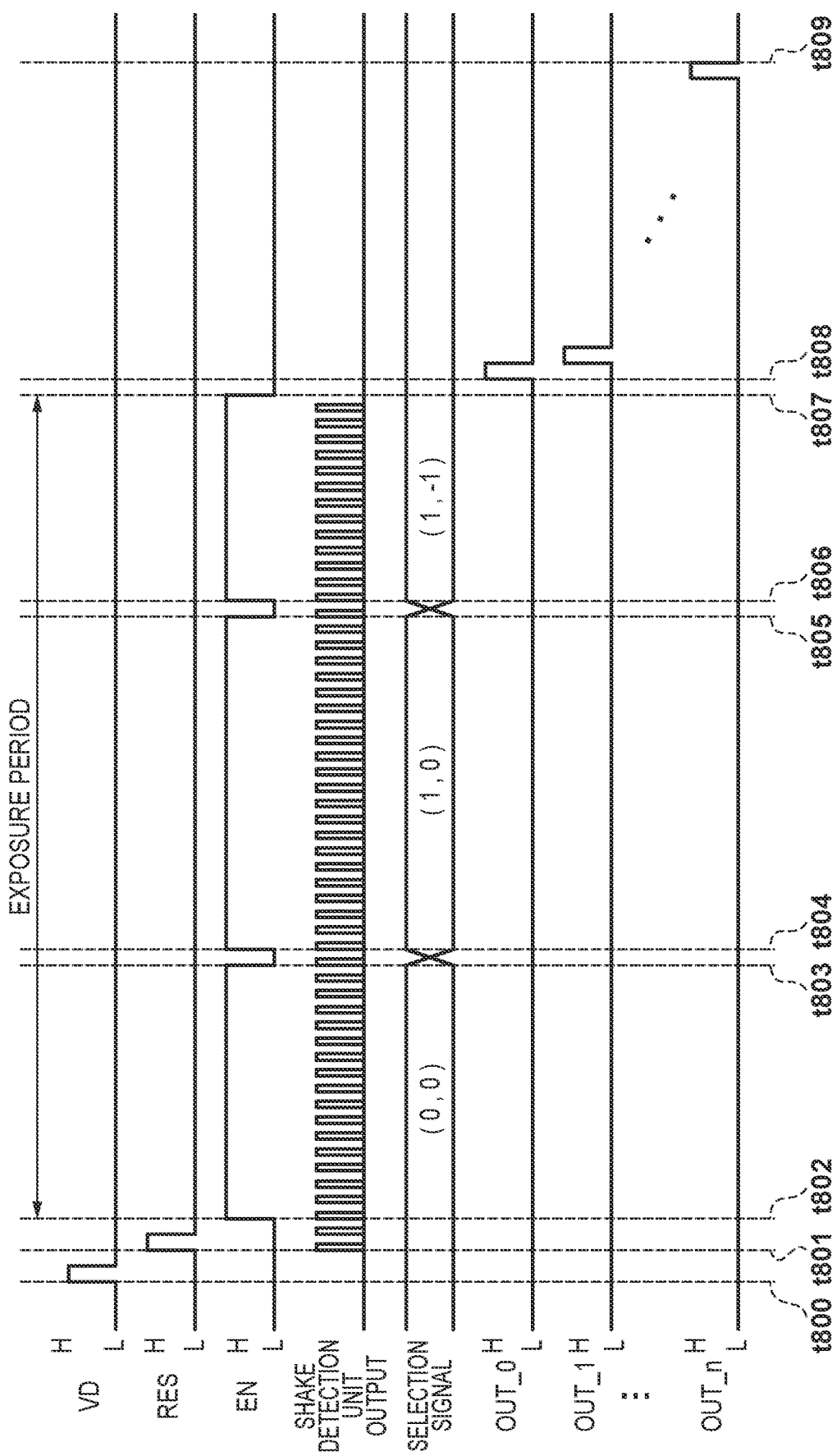

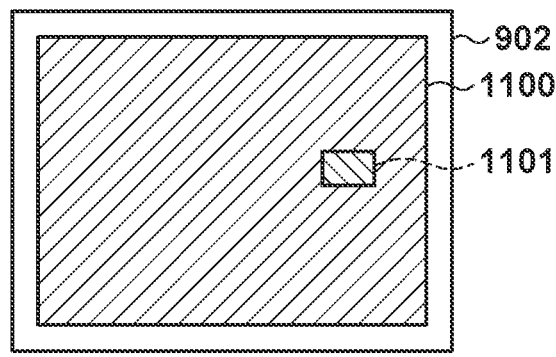
F I G. 10A
F I G. 10B
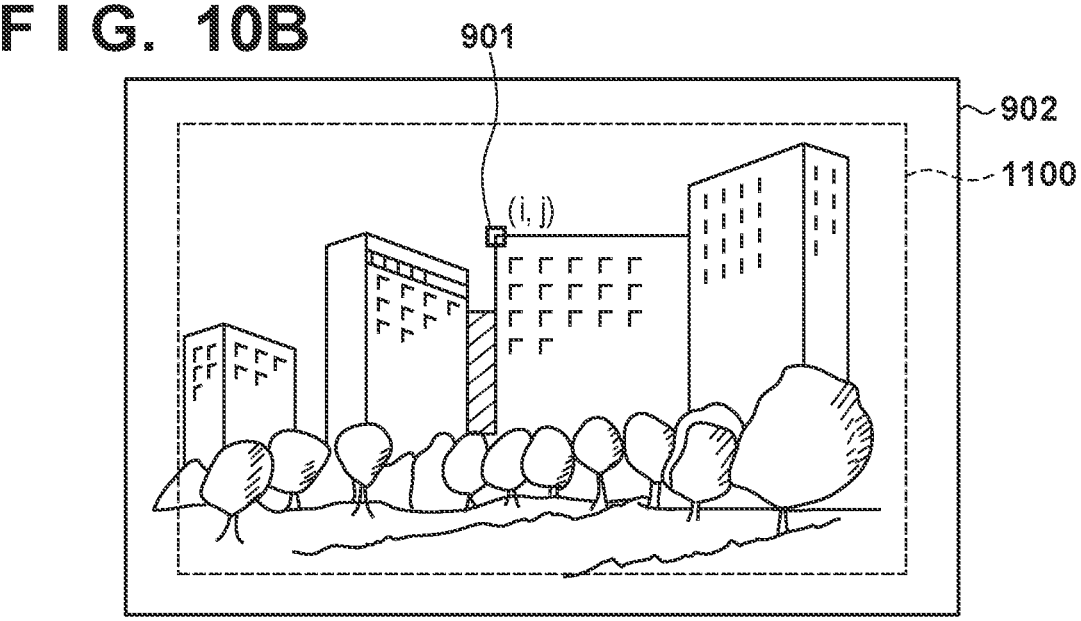
F I G. 10C
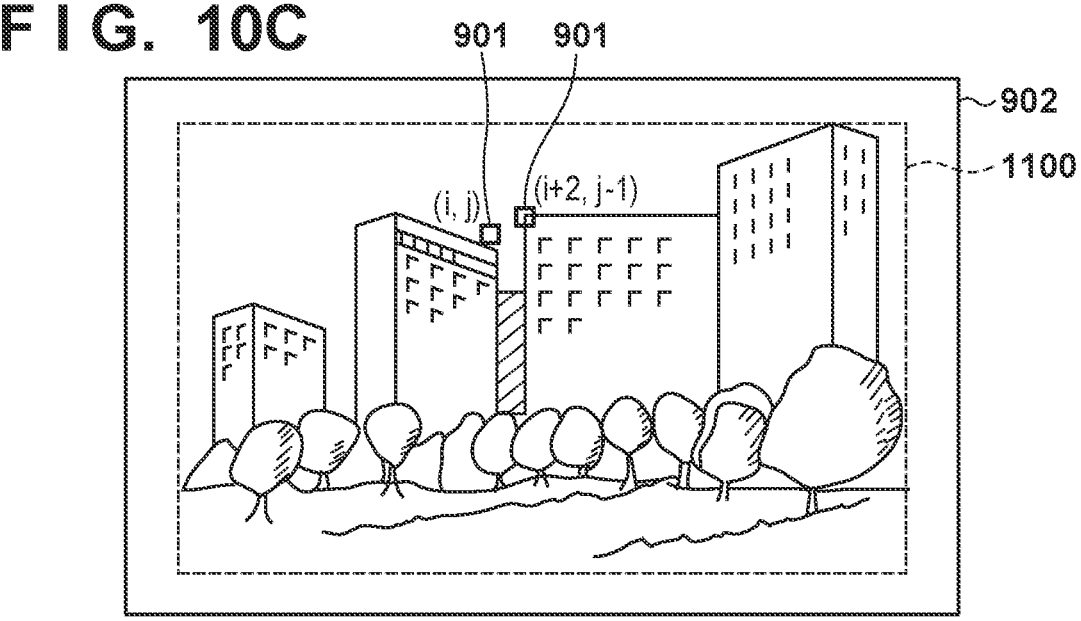

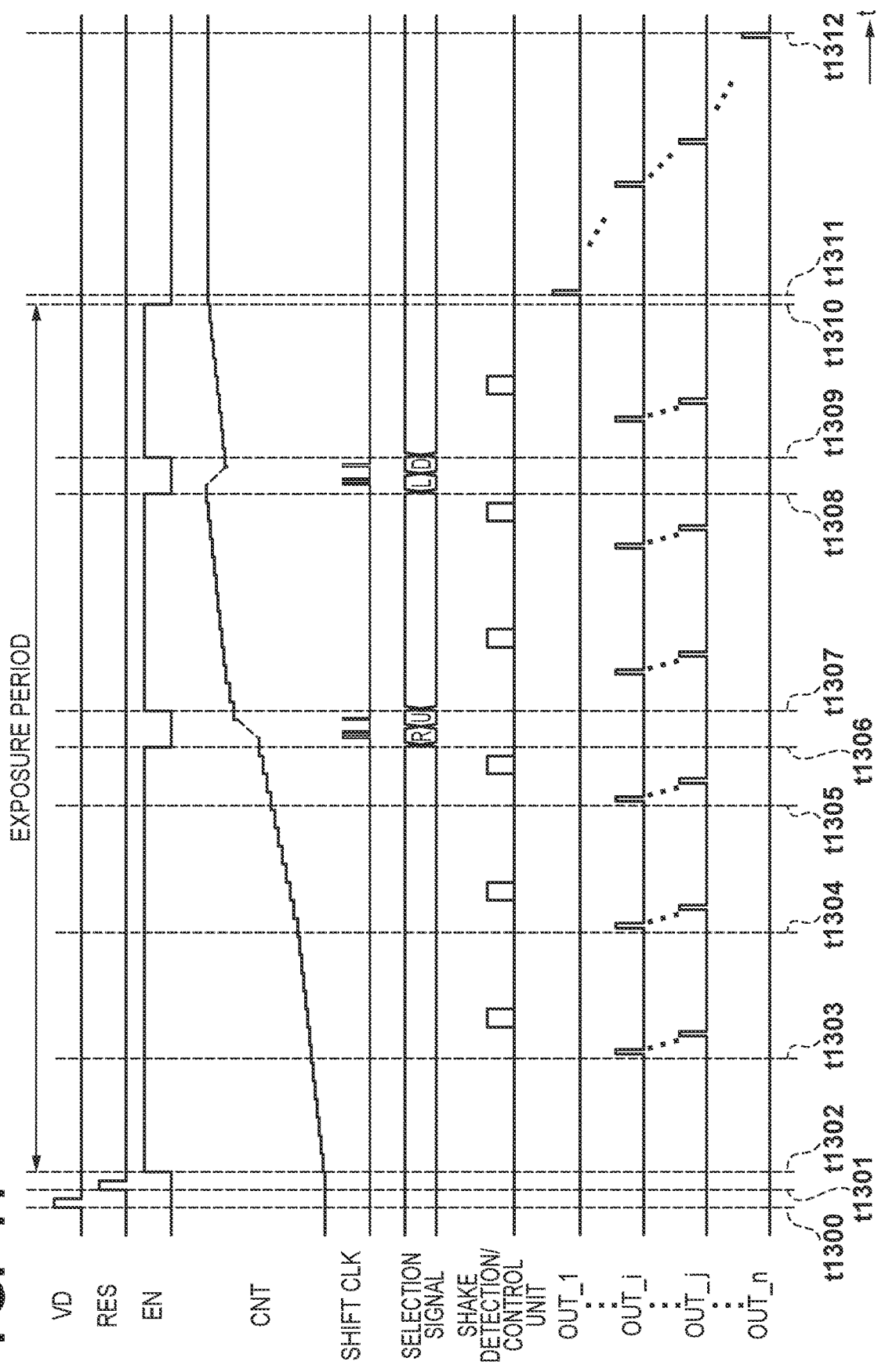

IMAGE SENSOR AND ELECTRONIC DEVICE HAVING THE SAME

BACKGROUND OF THE INVENTION

Field of the Invention

The present invention relates to an image sensor and an electronic device having the same.

Description of the Related Art

Electronic shake correction is known as an existing method for correcting image shake produced when an image capture apparatus moves. Electronic shake correction does not require mechanical driving, and thus has advantages over optical shake correction in terms of miniaturization and reduced costs.

Generating a high-dynamic range image by combining multiple images is also a known technique (Japanese Patent Laid-Open No. 2010-193524). Japanese Patent Laid-Open No. 2010-193524 discloses registering images when combining the images, to correct image shake in the resulting composite image.

However, the configuration disclosed in Japanese Patent Laid-Open No. 2010-193524 requires that the image sensor be provided with frame memory for combining the images, which increases the circuit size. Image resolutions (the number of pixels per frame) continue to rise, which means that the required size of such frame memory will likely continue to rise as well.

SUMMARY OF THE INVENTION

The present invention provides an image sensor that can easily obtain an image in which shake is corrected, while at the same time suppressing an increase in the circuit size.

According to an aspect of the present invention, there is provided an image sensor in which a plurality of pixels are arranged, each of the plurality of pixels including: a light-sensitive element that detects the incidence of single photons; and a counter that counts a pulse contained in a signal, wherein the image sensor further comprises a control unit that, on the basis of detected shake, switches a signal of the light-sensitive element supplied to the counter in a pixel, or replaces a count value of the counter of the pixel with a count value of the counter in another pixel.

According to another aspect of the present invention, there is provided an electronic device that comprises an image sensor having a plurality of pixels are arranged, wherein each of the plurality of pixels including: a light-sensitive element that detects the incidence of single photons; and a counter that counts a pulse contained in a signal, wherein the image sensor further comprises a control unit that, on the basis of detected shake, switches a signal of the light-sensitive element supplied to the counter in a pixel, or replaces a count value of the counter of the pixel with a count value of the counter in another pixel.

Further features of the present invention will become apparent from the following description of exemplary embodiments with reference to the attached drawings.

BRIEF DESCRIPTION OF THE DRAWINGS

FIG. 3 is a circuit diagram illustrating an example of the configuration of a pixel unit according to the first embodiment.

FIGS. 6A to 6D are diagrams pertaining to shake correction driving according to the first embodiment.

FIG. 7 is a timing chart illustrating a method for driving the image sensor according to the first embodiment.

FIGS. 10A to 10C are diagrams pertaining to an active pixel region and a region of interest in the pixel unit, and to shake correction driving, according to the second embodiment.

FIG. 11 is a timing chart illustrating a method for driving the image sensor according to the second embodiment.

DESCRIPTION OF THE EMBODIMENTS

Figure 1:
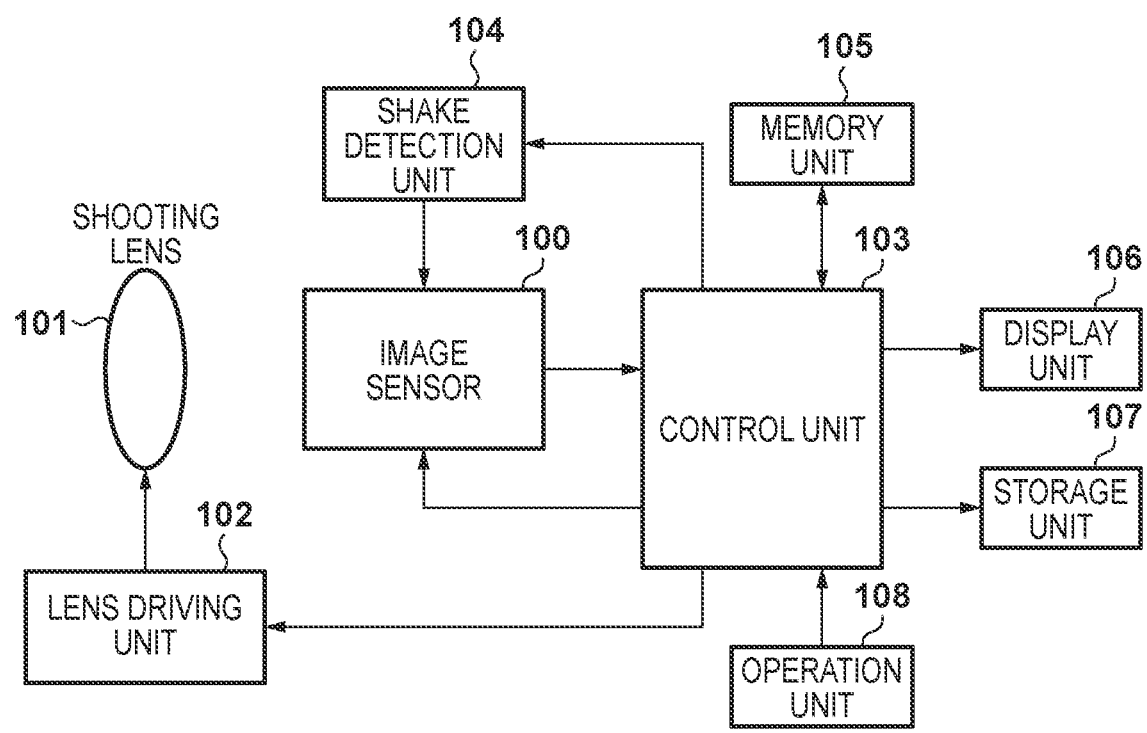
FIG. 1 is a block diagram illustrating an example of the functional configuration of an image capture apparatus according to embodiments.

Exemplary embodiments of the present invention will now be described in detail in accordance with the accompanying drawings. In the drawings, like elements are given like reference signs, and descriptions thereof may be omitted. Although the following describes embodiments in which the present invention is applied in an image capture apparatus, which is an example of an electronic device including an image sensor, the present invention can be applied in any electronic device that can include an image sensor. A personal computer, a tablet terminal, a mobile phone, a game console, a drive recorder, a robot, a drone, and the like can be given as examples of such an electronic device aside from an image capture apparatus. The electronic device is not limited to these examples, however.

First Embodiment

FIG. 1 is a block diagram illustrating an example of the overall functional configuration of an image capture apparatus according to the first embodiment of the present invention. A shooting lens 101 includes a lens group and an aperture stop, and forms an optical image of an object on an image capturing surface of an image sensor 100. The shooting lens 101 includes a mechanism for driving a movable lens, the aperture stop, and the like (e.g., a motor or an actuator). The aperture stop may function as a mechanical shutter.

The image sensor 100 includes a plurality of pixels, and the optical image formed by the shooting lens 101 is converted into image data by photoelectric conversion units included in the pixels. In the present embodiment, the image sensor 100 employs photoelectric conversion units capable of detecting single photons, and can therefore obtain pixel values directly as digital values without A/D conversion. The image sensor 100 will be described in detail later.

A lens control unit 102 controls the driving of a focus lens, the aperture stop, and the like of the shooting lens 101 in response to instructions from a control unit 103.

The control unit 103 is a programmable processor such as a CPU, and controls the operations of the various units in the image capture apparatus to realize the functions of the image capture apparatus by loading pre-stored programs into memory 105, for example, and executing the programs. Exposure and readout operations of the image sensor 100, image processing on image data read out from the image sensor 100, automatic exposure control and automatic focus detection based on image data, and the like are executed by the control unit 103. The control unit 103 also controls the operations of a shake detection unit 104 that detects movement of the image capture apparatus. Note that the programs executed by the control unit 103 can be stored in non-volatile memory included in the memory 105.

The shake detection unit 104 includes an acceleration sensor, for example, and supplies a shake detection signal based on movement of the image capture apparatus to the image sensor 100. The image sensor 100 is then driven on the basis of the shake detection signal so as to correct shake. The shake detection unit 104 samples acceleration at approximately 100 kHz intervals and supplies the shake detection signal to the image sensor 100 at a frequency of 10 to 20 kHz, for example.

The memory 105 includes non-volatile memory and volatile memory, and stores programs, setting values, GUI data, and the like in the non-volatile memory. The non-volatile memory is also used as system memory when executing programs, as buffer memory for temporarily storing image data, and as display memory.

A display unit 106 is an LCD or an OLED, for example, and displays captured images, images read out from a recording unit 107, various information such as setting values and statuses of the image capture apparatus, a GUI, and the like. A live view image is displayed in the display unit 106 during shooting standby, when recording moving images, and the like, and the display unit 106 can therefore also function as an electronic viewfinder.

The recording unit 107 is a recording medium, a storage device, or the like that records image data obtained from shooting. A semiconductor memory card is an example of a typical recording medium used as the recording unit 107.

An operation unit 108 is a group of devices through which a user inputs instructions to the image capture apparatus. The operation unit 108 includes a power switch, a shutter button, a menu button, a direction key, an OK button, a record/playback mode changing switch, a shooting mode selection dial, and the like, but these are merely examples. If the display unit 106 is a touch display, the display unit 106 also functions as part of the operation unit 108. The control unit 103 monitors user operations made in the operation unit 108 and executes operations based on detected operations.

Figure 2:
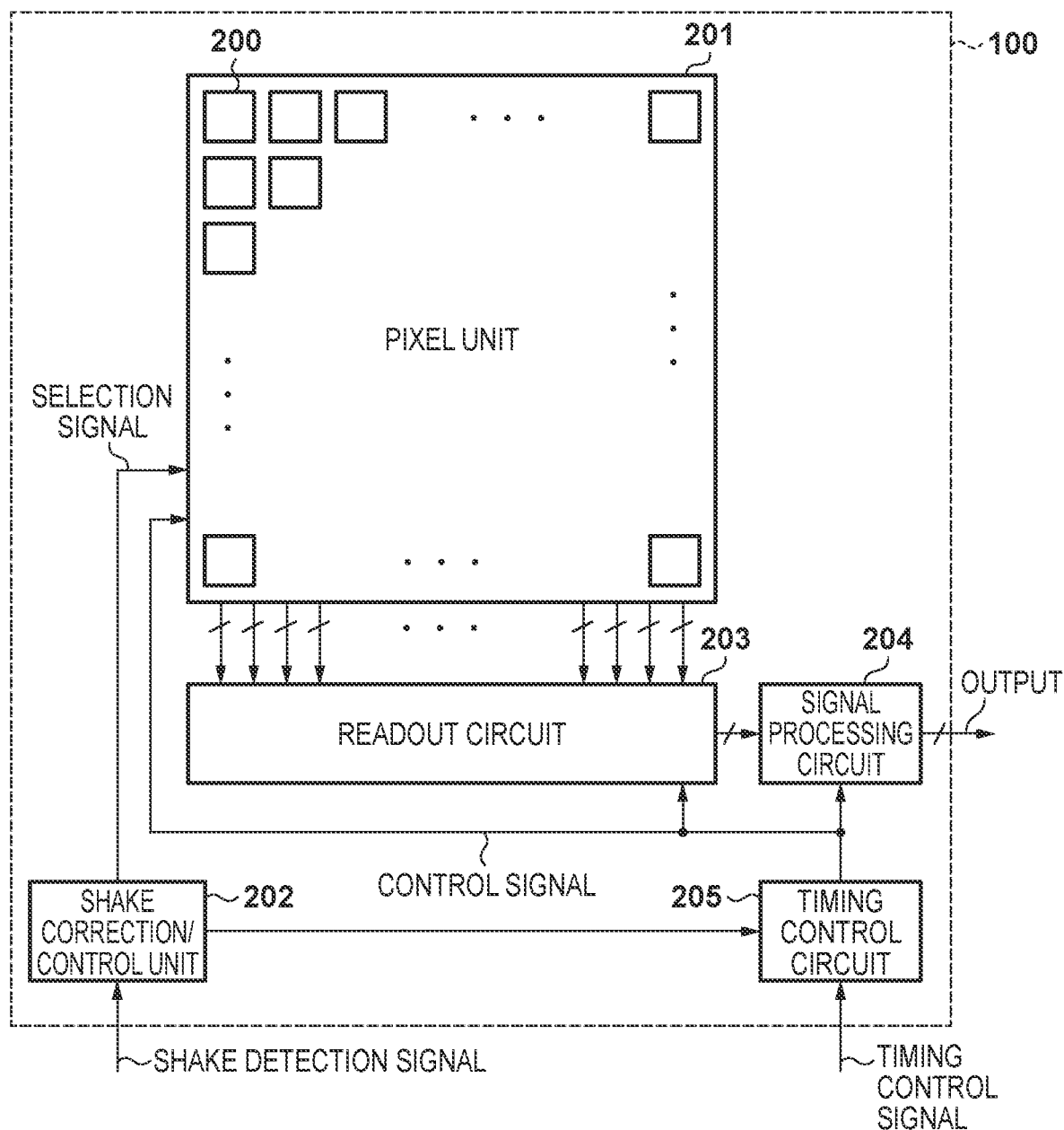
FIG. 2 is a diagram illustrating an example of the configuration of an image sensor according to a first embodiment.

An example of the configuration of the image sensor 100 will be described next with reference to FIG. 2. The image sensor 100 includes a pixel unit 201, in which a plurality of pixels 200 are disposed in a matrix, a shake correction control unit 202, a readout circuit 203, a signal processing circuit 204, and a timing control circuit 205.

Each of the pixels 200 includes a photoelectric conversion unit capable of detecting single photons, and outputs a digital value in accordance with the number of incident photons. The pixel unit 201 can also carry out electronic shake correction (described in detail later).

The shake correction control unit 202 calculates a direction and amount by which a subject image formed by the shooting lens 101 on an image capturing surface of the image sensor 100 moves, on the basis of the shake detection signal supplied by the shake detection unit 104. The shake correction control unit 202 then calculates a shift direction and a shift amount to be used for the electronic shake correction, and supplies selection signals based on the shift direction and shift amount to the pixel unit 201.

The readout circuit 203 sequentially reads out one row's worth of values (pixel data) at a time from the pixels 200 disposed in the pixel unit 201, and outputs those values to the signal processing circuit 204.

The signal processing circuit 204 makes various corrections, such as black level correction, to the read-out pixel data, and outputs the corrected pixel data to the control unit 103.

The timing control circuit 205 supplies control signals for controlling driving timings to the pixel unit 201, the readout circuit 203, and the signal processing circuit 204.

An example of the configuration of the pixel unit 201 of the image sensor 100 will be described next with reference to FIG. 3. FIG. 3 illustrates the configuration of a region of the pixel unit 201 constituted by three pixels in the horizontal direction and three pixels in the vertical direction. The same configuration is provided in the pixel unit 201 as a whole.

The individual pixels 200 all have the same configuration, with each including a light-sensitive element (a photoelectric conversion unit) 300, a selection circuit 301, and a counter 302. The light-sensitive element 300 is an avalanche photodiode (APD) operating in Geiger-mode, for example, and the output potential changes in pulse form each time a single photon is incident thereon.

Figure 4A:
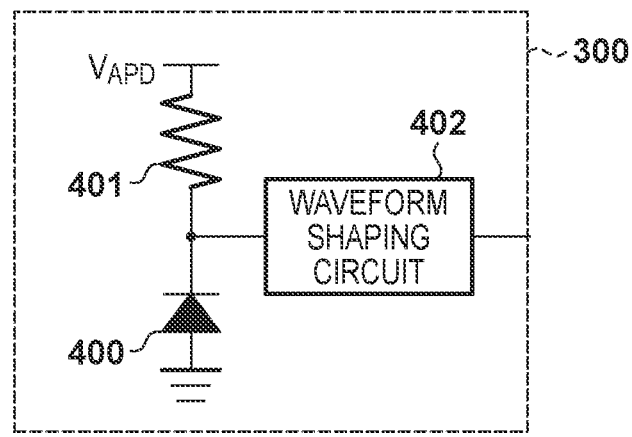
FIGS. 4A and 4B are diagrams illustrating an example of the configuration of a light-sensitive element, and an active pixel region of the pixel unit, according to the first embodiment.

An example of the configuration of the light-sensitive element 300 of the pixel 200 will be described here with reference to FIG. 4A. The light-sensitive element 300 includes an avalanche photodiode (APD) 400, a quenching resistor 401, and a waveform shaping circuit 402. The APD 400 is connected to a reverse-bias voltage VAPD through the quenching resistor 401, and produces a charge through avalanche amplification when a photon is incident. The produced charge is discharged through the quenching resistor 401. The waveform shaping circuit 402 outputs a potential change, which results from the generation and discharge of the charge in response to photon incidence, as a rectangular pulse through amplification and edge detection.

The selection circuit 301 takes the output from the light-sensitive element 300 disposed in the same pixel 200, and output signals from the light-sensitive elements 300 of the eight pixels 200 surrounding that pixel 200, as inputs, selects a single signal in accordance with the selection signal, and outputs the selected signal to the counter 302.

The counter 302 counts the number of pulses contained in the input signal. In other words, the count value of the counter 302 expresses the number of photons incident on the light-sensitive element 300 outputting the signal selected by the selection circuit.

As described above, the selection circuit 301 selects one of the nine output signals from the light-sensitive elements, in accordance with the selection signal supplied from the shake correction control unit 202, and outputs the select signal to the counter 302. The selection signal is supplied to all the pixels 200 disposed in the pixel unit 201, and thus in each pixel 200, the selection circuit 301 selects the same one of the nine signals. For example, at a given timing, the counter 302 of each pixel 200 counts the number of pulses contained in the signal output from the light-sensitive element 300 disposed within the same pixel 200. On the other hand, at another timing, the counter 302 of each pixel 200 counts the number of pulses contained in the signal output from the light-sensitive element 300 in the pixel 200 located to the upper-left of the pixel 200 in which that counter 302 is disposed.

In this manner, in the present embodiment, the counter 302 of each pixel 200 can, in response to the selection signal provided from the shake correction control unit 202, select the light-sensitive element 300 for which pulses are to be counted from among the light-sensitive elements 300 in nine pixels, including the eight adjacent pixels in the periphery of the pixel in question. In other words, each pixel 200 can count the number of photons incident on the light-sensitive element 300 in the eight adjacent pixels in the periphery of the pixel in question, or in that pixel 200 itself, as a number of photons incident on the light-sensitive element 300 in that pixel 200 itself. This makes it possible to shift the readout range of the image in the horizontal direction, the vertical direction, and a 45° diagonal direction, by a pitch equivalent to one pixel. Accordingly, electronic shake correction can be realized by supplying selection signals from the shake correction control unit 202 so that the readout range of the image is shifted in a direction that cancels out movement of the apparatus expressed by the shake detection signal.

The control signals supplied from the timing control circuit 205 control the counter 302 with respect to resetting the count value, switching between activating/deactivating the count, and whether or not to output the count value. The count value output by the counter 302 is input to the readout circuit 203 through a vertical output line 303 connected in common to a plurality of the pixels 200 disposed in the vertical direction.

Of the pixels 200 disposed in the pixel unit 201, the pixels 200 located on the outermost edges have no pixels adjacent thereto in some directions. As such, of the eight inputs to the selection circuits 301 provided in the outermost pixels 200, the input corresponding to the nonexistent adjacent pixel is grounded. A pulse is not input to the counter 302 when a grounded input is selected by the selection signal, and thus the count value does not change from its initial value.

Figure 4B:
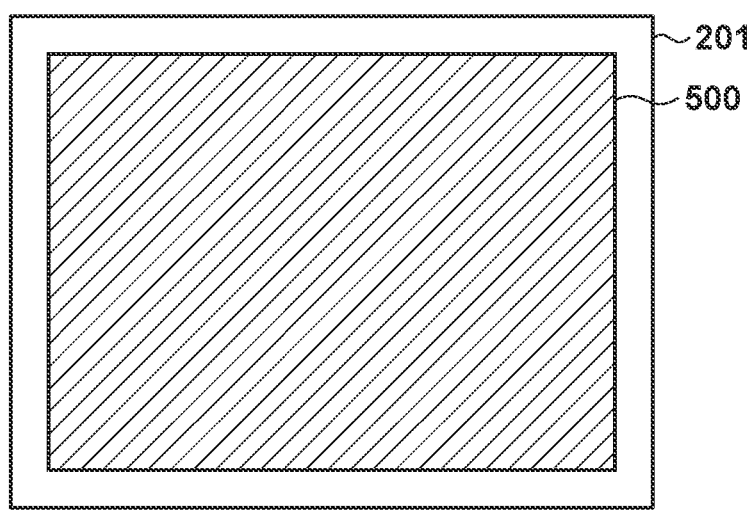

As such, more pixels 200 than there are pixels in the captured image are provided in the pixel unit 201 so that pixel values are obtained even for the outermost pixels of the captured image. FIG. 4B schematically illustrates an active pixel region 500, in which of the pixels 200 disposed in the pixel unit 201, pixels that output pixel signals constituting the captured image (active pixels) are disposed. At least one row's worth or one column's worth of shake correction pixels are disposed in the periphery of the active pixel region 500. As a result, at least eight adjacent pixels are present in the periphery of even the outermost pixels of the active pixel region 500, and thus none of the eight inputs of the selection circuits 301 are grounded. Therefore, appropriate pixel values (count values) are obtained by all of the active pixels, regardless of what selection signals are input.

Figure 5:
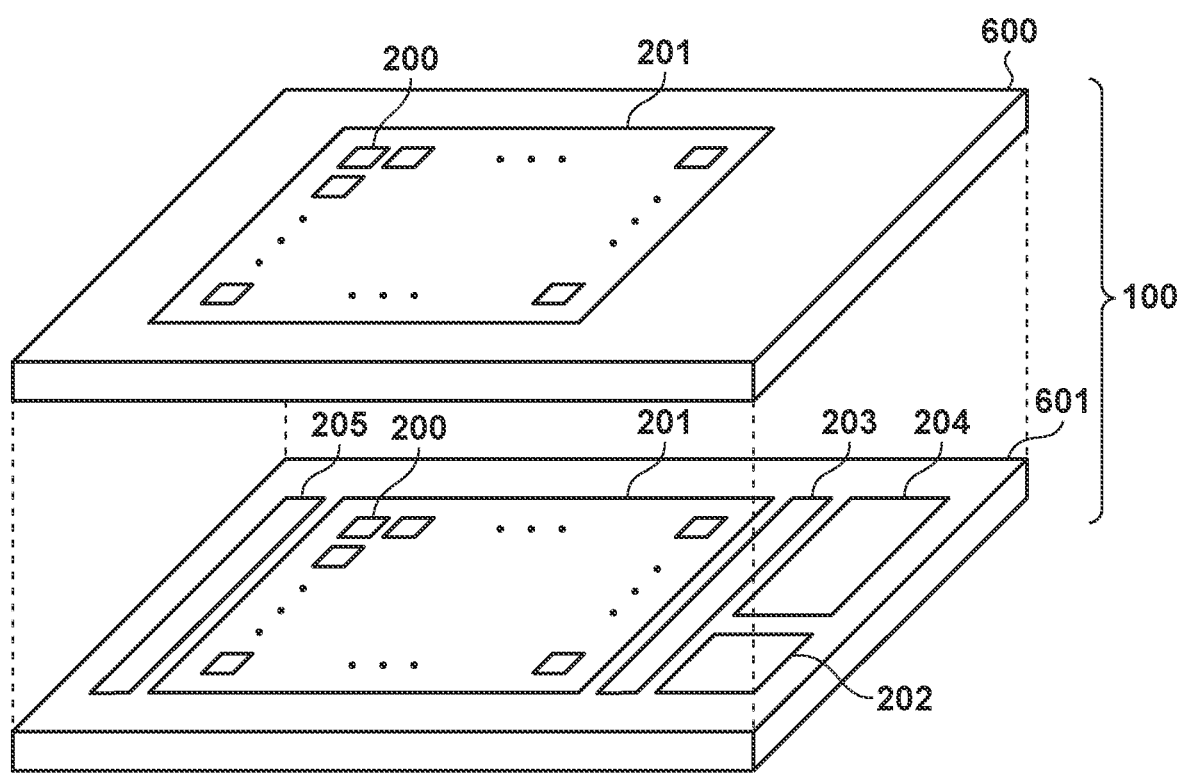
FIG. 5 is a schematic diagram illustrating an example of the configuration of the image sensor according to the first embodiment.

An example of the structure of the image sensor 100 will be described next with reference to FIG. 5. FIG. 5 is a perspective view schematically illustrating an example of a configuration when the image sensor 100 has a stacked semiconductor chip structure. As illustrated in FIG. 3, in the image sensor 100 according to the present embodiment, each pixel 200 includes many constituent elements, and the counter 302 in particular is constituted by a multi-bit counter. This increases the circuit size. Implementing the image sensor 100 with a stacked structure, in which multiple semiconductor chips are connected in units of pixels, is useful because doing so makes it possible to reduce the mounting surface area, wiring length, and so on of the image sensor 100.

The image sensor 100 is constituted by an upper substrate 600 and a lower substrate 601. Of the pixels 200, the light-sensitive elements 300 are provided in the upper substrate 600, and the selection circuits 301 and the counters 302 are provided in the lower substrate 601. Furthermore, the shake correction control unit 202, the readout circuit 203, the signal processing circuit 204, and the timing control circuit 205 are provided in the lower substrate 601. In each pixel 200, the light-sensitive element 300 provided in the upper substrate 600 and the selection circuit 301 provided in the lower substrate 601 are electrically connected by an electrode (not shown).

By employing such a configuration, the image sensor 100 can secure an aperture area sufficient for photons to the incident on the APD 400 on the upper substrate 600 side, while at the same time securing a sufficient surface area for disposing the counter 302 on the lower substrate 601 side. Note that the image sensor 100 may be structured differently depending on the purpose, application, and so on. For example, a stacked structure having three or more semiconductor chips may be used, or only a single chip may be used. Additionally, the multiple semiconductor chips in the stacked structure may have different processing rules.

A method for driving the image sensor 100 will be described with reference to FIGS. 6A to 6D and 7. First, a method for driving for the purpose of shake correction will be described with reference to FIGS. 6A to 6D.

FIG. 6A schematically illustrates a positional relationship between a subject image and the image sensor 100 at the start of a shot. FIG. 6B illustrates a connection relationship between the counters 302 and the light-sensitive elements 300 in the pixel 200 at the start of a shot. FIG. 6C schematically illustrates a state in which the positional relationship between the subject image in the image sensor 100 has changed due to shake occurring during the shot. FIG. 6D illustrates a state in which the connection relationship between the counters 302 and the light-sensitive elements 300 has been changed by the selection signals in order to correct the shake. Note that of the pixels 200 in the pixel unit 201, FIGS. 6B and 6D illustrate 3×3 pixels positioned in the center. The selection circuits of the pixels are not illustrated.

At the start of the shot (an initial state), the counters 302 of the pixels 200 are connected so as to count the pulses in the output signals from the light-sensitive elements 300 within those same pixels 200, as illustrated in FIG. 6B.

Assume that shake has occurred while shooting a moving image, for example, and the subject image on the image sensor 100 has moved to the right by the same distance as the horizontal pitch of the pixels 200, as illustrated in FIG. 6C. In this case, the shake correction control unit 202 generates the selection signals to correct the shake, and changes the light-sensitive elements 300 connected to the counters 302. Specifically, the shake correction control unit 202 generates the selection signals so that the numbers of pulses contained in the output signal from the light-sensitive elements 300 adjacent horizontally to the right of the pixels are counted.

Note that the shake correction control unit 202 converts the movement amount of the apparatus, which is based on the shake detection signal from the shake detection unit 104, into a movement amount of the optical image on the image sensor, taking into account the current angle of view of the shooting lens 101. The shake correction control unit 202 then compares the movement amount of the optical image with a pre-stored arrangement interval (pixel pitch) of the pixels 200 in the vertical direction and the horizontal direction to detect that the movement amount has reached the pixel pitch amount. Note that the conversion from the shake detection signal to the movement amount of the optical image on the image sensor can be realized through calculations, or by referring to a conversion table prepared in advance. Any method may be used as long as the movement amount of the optical image on the image sensor can be obtained on the basis of the shake detection signal.

In this manner, an image in which shake is corrected can be obtained by changing the connection relationship between the counters and the light-sensitive elements in accordance with the detected shake, even if the subject image has moved on the image sensor 100 due to the shake. The configuration switches the light-sensitive elements counted by the pixels in the image sensor, and thus memory for storing images is not needed, unlike a configuration in which a cutout range of an image stored in memory is changed.

Here, for the sake of simplicity, the selection signal is expressed with relative pixel coordinates (x,y) where the light-sensitive element 300 subject to pulse number counting is located, using the origin of the pixels in which the counters 302 are present as (0,0). Thus the selection signal in the state illustrated in FIG. 6B is represented by (0,0). As illustrated in FIG. 6D, the selection signal controlling a state of counting the number of pulses in the output signal of the light-sensitive element 300 in the pixel 200 horizontally adjacent to the right is represented by (1,0). Likewise, the selection signals controlling a state of counting the number of pulses in the output signals of the light-sensitive elements 300 in the pixels 200 vertically adjacent above and below are represented by (0,−1) and (0,1), respectively.

Driving operations for obtaining one frame's worth of image data from the image sensor 100 will be described next with reference to the timing chart illustrated in FIG. 7. Here, VD represents a timing control signal input to the timing control circuit 205 from the control unit 103, and expresses the timing of the start of obtaining the one frame's worth of the image. The timing control circuit 205 can output various control signals at predetermined timings on the basis of the obtainment start timing, for example.

Meanwhile, RES, EN, and OUT_1 to OUT_n represent control signals input to the counter 302. When RES goes to H level, the count value of the counter 302 is reset to an initial value (0 here). EN is a signal controlling the activation and deactivation of the count operations by the counter 302. Here, it is assumed that the counter 302 counts the number of pulses while EN is at H level. OUT_1 to OUT_n control the output timings of the count values of the counters 302 in the pixels 200 disposed in the nth row (where n is an integer of 1 or greater) within the active pixel region 500. When OUT_1 to OUT_n go to H level, the corresponding pixels 200 output the count values from the counters 302 to the vertical signal line. Through this, the readout circuit 203 can read out the count values from the pixels on a row-by-row basis. "Shake detection unit output" schematically indicates the timing and frequency at which the shake detection unit 104 outputs the shake detection signal. "Selection signal" indicates the selection signal supplied to the pixels by the shake correction control unit 202 according to the above-described method.

At time t800, the control unit 103 sets VD to H level to start obtaining one frame's worth of an image. At this time, the shake correction control unit 202 is outputting selection signal (0,0), and thus the counters 302 are connected to the light-sensitive elements 300 in that same pixel, as illustrated in FIG. 6B.

At time t801, the timing control circuit 205 sets RES to H level, which resets the count values of the counters 302 in all the pixels 200. The shake detection unit 104 also starts outputting the shake detection signal. On the basis of the shake detection signal, the shake correction control unit 202 calculates the direction and amount of movement of the subject image on the image sensor 100 caused by the shake.

At time t802, the timing control circuit 205 sets EN to H level, which starts the counting of the pulse numbers by the counters 302 in all the pixels 200. At this point in time, the selection signal remains (0,0), and thus the counters 302 count the number of pulses contained in the output signals from the light-sensitive elements 300 in those same pixels 200 (that is, the number of incident photons).

Assume that at time t803, the shake correction control unit 202 has detected that the movement amount of the subject image on the image sensor 100, in the horizontal direction or the vertical direction, has become equivalent to the arrangement interval (pitch) of the pixels 200 in that same direction. The shake correction control unit 202 starts shake correction control. First, the shake correction control unit 202 notifies the timing control circuit 205 to temporarily stop the count operations.

Upon receiving the notification from the shake correction control unit 202, the timing control circuit 205 sets EN to low level (L level) and stops the operations of the counters 302. Meanwhile, the shake correction control unit 202 generates the selection signal for correcting the shake and supplies the selection signal to all the pixels. When, as a result of the shake, the subject image moves to the right, from the state illustrated in FIG. 6A, by an amount equivalent to the horizontal pixel pitch, and the state becomes as illustrated in FIG. 6C, the shake correction control circuit 202 changes the selection signal from (0,0) to (1,0).

The timing control circuit 205 returns EN to H level once a predetermined amount of time has passed after time t803, and time t804 has been reached. As a result, the counters 302 in the pixels 200 resume the counting operations. Because the selection signal has been changed to (1,0), the counters 302 subsequently count the number of pulses for the output signals of the light-sensitive elements 300 within the pixels 200 that are adjacent to the right in the horizontal direction.

Assume that at time t805, the shake correction control unit 202 has detected that the movement amount of the subject image on the image sensor 100, following the change in the selection signal, has become equivalent to the pixel pitch. Here, it is assumed that the image has moved downward. The shake correction control unit 202 changes the selection signal to (1,−1), in the same manner as in the processing carried out at time t803.

At time t806, the timing control circuit 205 returns EN to H level, and the counters 302 resume the counting operations. Because the selection signal has been changed to (1,−1), the counters 302 subsequently count the number of pulses in the output signals from the light-sensitive elements 300 within the adjacent pixels 200 on the lower-right.

At time t807, the timing control circuit 205 sets EN to L level and stops the counting operations of the counters 302 in order to end the shooting period (the exposure period).

From time t808, the timing control circuit 205 sets the OUT_1 to OUT_n to H level in sequence. As a result, the count values of the counters 302 are sequentially read out to the readout circuit 203 as pixel signals through the vertical signal line, from the pixels 200 in the nth row for which OUT_n has gone to H level. The read-out pixel signals are output to the exterior of the image sensor 100 through the signal processing circuit 204.

At time t809, the pixel signals from all of the pixels 200 in the active pixel region 500 are output by the image sensor 100, and the obtainment of one frame's worth of the image by the image sensor 100 ends.

The image sensor 100 counts the incident photons in the period from time t802 to t807, and outputs the resulting pixel signals. Strictly speaking, incident photons are not counted in the periods when the selection signal is changed (t803 to t804 and t805 to t806), but because these periods are extremely short compared to the exposure period, the influence thereof on the image can be ignored.

The present embodiment describes a configuration in which an output signal from a light-sensitive element in a peripheral pixel can be selectively input to the counter 302 of a pixel which includes the light-sensitive element 300, which can detect the incidence of single photons, and the counter 302, which counts the number of incident photons. Switching the output signal input to each counter 302 in accordance with the shake of the image sensor makes it possible to obtain an image in which image shake caused by the stated shake has been corrected. According to the configuration of the present embodiment, electronic shake correction can be realized without needing memory for storing images.

Additionally, pixel values are obtained by counting the number of photons incident on the light-sensitive elements, and thus no A/D conversion is required to obtain digital values. Accordingly, quantization error caused by the A/D conversion will in principle not arise, providing an advantage in that there is no degradation in the image quality caused by quantization error. When generating a single composite image from a plurality of shot images, there is a problem in that if A/D conversion is carried out when the individual images are generated, noise caused by quantization error in the A/D conversion accumulates in the composite image. However, such A/D conversion is not necessary in the present embodiment, and thus this problem does not arise. This technique is therefore particularly suited to the shooting of images that will serve as the basis of a composite image.

To simplify the descriptions and facilitate understanding, the present embodiment describes a configuration in which the signals from the light-sensitive elements 300 in the eight adjacent pixels in the periphery of a given pixel can be input to the counter 302 in that given pixel. However, the configuration may be such that the signals from the light-sensitive elements 300 in a wider range of pixels can be input to the counter.

Second Embodiment

Next, a second embodiment of the present invention will be described. The following will primarily describe areas that are different from the first embodiment. The present embodiment differs from the first embodiment in that the image sensor includes the function of the shake detection unit 104, and the configuration of the pixels is different.

Figure 8:
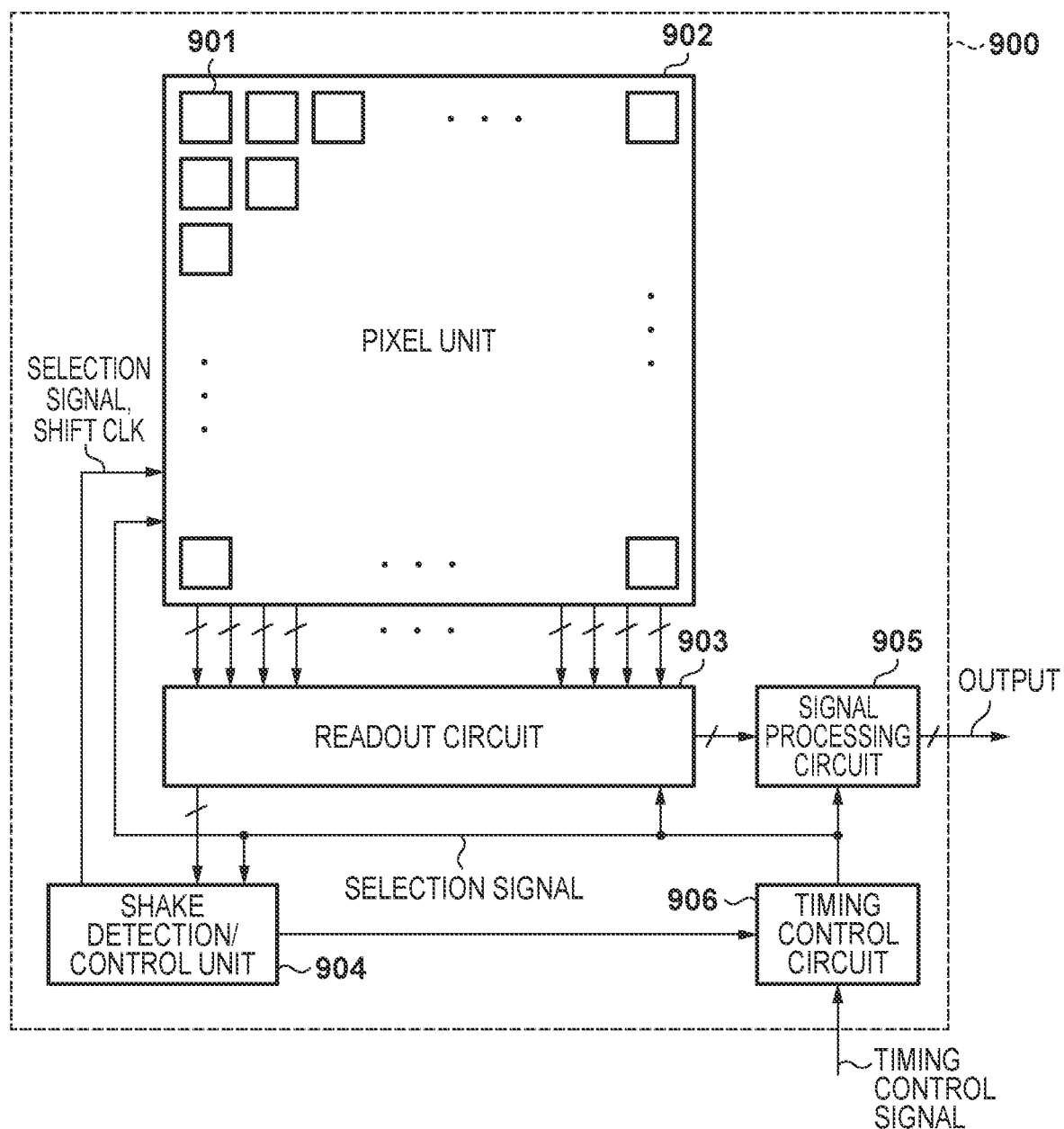
FIG. 8 is a diagram illustrating an example of the configuration of an image sensor according to a second embodiment.

An example of the configuration of an image sensor 900 according to the present embodiment will be described with reference to FIG. 8. Of the constituent elements in the image sensor 900, a signal processing circuit 905 and a timing control circuit 906 are the same as the circuits in the first embodiment that have the same names.

A readout circuit 903 is the same as that in the first embodiment, in terms of reading out pixel signals from an active pixel region in a pixel unit 902 and outputting the signals to the signal processing circuit 905, at the end of the obtainment of one frame's worth of an image. In addition to this, the readout circuit 903 of the present embodiment periodically reads out pixel signals from a region of interest within the active pixel region during the exposure period (that is, during a period in which count operations are active), and outputs those pixel signals to a shake detection/control unit 904.

The shake detection/control unit 904 detects shake of the image sensor on the basis of the pixel signals from the region of interest, which are periodically read out by the readout circuit 903. For example, the shake detection/control unit 904 calculates a difference between the pixel signal read out this time and a pixel signal read out in the past. The shake detection/control unit 904 then detects edges or characteristic points in the obtained differential image, detects movement in the edges or characteristic points, and so on. The shake detection/control unit 904 then detects the direction and amount of movement (shake) of the image sensor on the basis of the movement in the edges or characteristic points. Furthermore, the shake detection/control unit 904 calculates a shift direction and shift amount of the pixel unit 902 on the basis of the detected shake, and supplies a selection signal and a shift CLK to the pixel unit 902 as control signals for correcting the shake. Accordingly, in the present embodiment, the image sensor has a function for detecting shake, and thus the shake detection unit 104 of the image capture apparatus is not necessary.

Figure 9:
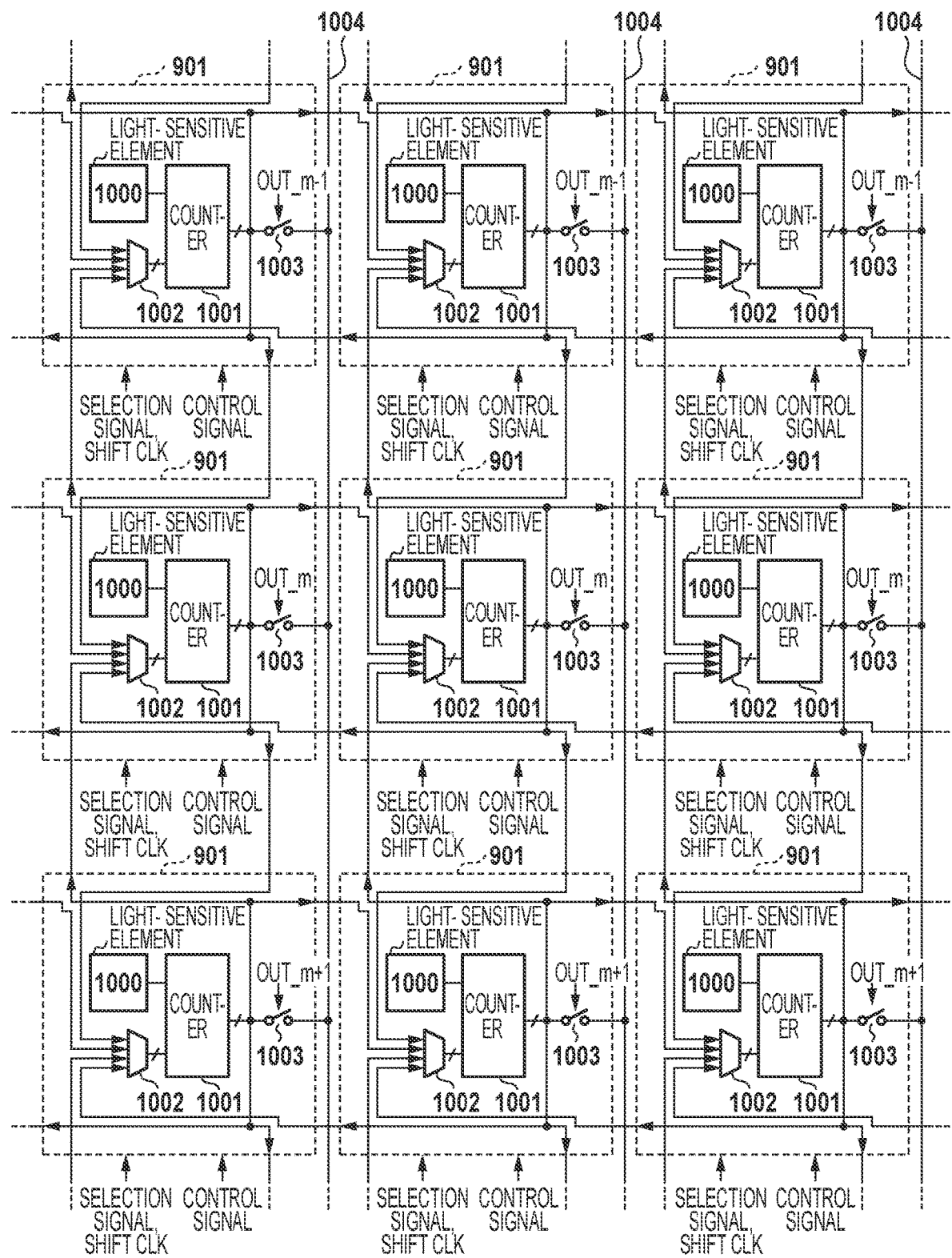
FIG. 9 is a circuit diagram illustrating an example of the configuration of a pixel unit according to the second embodiment.

An example of the configuration of the pixel unit 902 of the image sensor 900 will be described next with reference to FIG. 9. FIG. 9 illustrates the configuration of a region of the pixel unit 902 constituted by three pixels in the horizontal direction and three pixels in the vertical direction. The same configuration is provided in the pixel unit 902 as a whole.

Individual pixels 901 all have the same configuration, with each including a light-sensitive element (a photoelectric conversion unit) 1000, a counter 1001, and a selection circuit 1002. The light-sensitive element 1000 has the same configuration as the light-sensitive element 300 of the first embodiment.

The counter 1001 counts the number of pulses contained in an output signal from the light-sensitive element 1000, and outputs the count value to the readout circuit 903 through an output switch 1003 and a vertical output line 1004. The count value of the counter 1001 is also output to the selection circuit 1002 in the four pixels 901 that are adjacent in the vertical direction and the horizontal direction. Furthermore, upon the shift CLK being input, the counter 1001 replaces the count value of that counter 1001 itself with a count value input by the selection circuit 1002.

The count values of the counters 1001 in the four pixels 901 that are adjacent in the horizontal and vertical directions are input to the selection circuit 1002. The selection circuit 1002 outputs one of the four count values to the counter 1001 in the same pixel 901 on the basis of the selection signal.

The output switch 1003 controls whether or not to output the count value of the counter 1001 to the vertical output line 1004. The output switch 1003 is controlled by OUT, which is a control signal common for each row of pixels, and the control signal common to the pixels in an mth row in the pixel unit 902 is represented by OUT m. The output switches 1003 turn on sequentially by row in response to OUT_m going to H level one by one. Count values are output to the vertical output line 1004 from the counters 1001 connected to the output switches 1003 that are on. Aside from the OUT, which controls the output of the count values to the vertical output line 1004, common selection signals, shift CLKs, and control signals are input to all of the pixels 901.

Of the pixels 901 disposed in the pixel unit 902, the pixels 901 located on the outermost edges have no pixels adjacent thereto in some directions. As such, of the four inputs to the selection circuits 1002 provided in the outermost pixels 901, the input corresponding to the nonexistent adjacent pixel is grounded.

An active pixel region 1100 and a region of interest 1101 of the pixel unit 902 in the image sensor 900 according to the present embodiment will be described with reference to FIG. 10A. As in the first embodiment, the active pixel region 1100 is a region in which pixels that output pixel signals constituting a captured image (active pixels) are disposed. 20 rows' worth or 20 columns' worth of shake correction pixels are disposed in the periphery of the active pixel region 1100.

In the present embodiment too, it is necessary for more pixels 901 than the maximum number of pixels in a captured image to be provided in order to correct shake. Also in the present embodiment, the maximum amount of shake that can be corrected is determined by the number of columns/number of rows of shake correction pixels disposed outside the active pixel region. As such, the number of columns and number of rows of shake correction pixels are determined in light of a trade-off between the surface area of the image sensor and the maximum amount of shake that can be corrected. The shake detection/control unit 904 carries out control so that the shift amount of the count values does not exceed the number of columns/number of rows of the shake correction pixels.

The region of interest 1101 is a region where the readout circuit 903 periodically reads out the count values of the counters 1001 in order for the shake detection/control unit 904 to detect shake. The region of interest 1101 can be set on the basis of user operations, an object recognition result from the control unit 103, or the like.

In the present embodiment, the selection circuit 1002 selects the count value of the counter 1001 in one of the up, down, left, and right directions using the selection signal, and replaces the count value of the counter 1001 with the count value input from the adjacent counter 1001 in accordance with the shift CLK. Repeating this replacement operation while switching the direction makes it possible to shift the count value of a given counter 1001 to a counter 1001 in a remote pixel 901. An image in which shake has been corrected can be obtained by counting the pulse signals from the light-sensitive elements 1000 while shifting the count values of the counters 1001 so as to correct the shake.

A method for driving the image sensor 900 according to the present embodiment will be described next with reference to FIGS. 10B, 10C, and 11. First, a method for driving for the purpose of shake correction will be described with reference to FIGS. 10B and 10C.

FIG. 10B schematically illustrates a positional relationship between a subject image, the pixel unit 902, and the active pixel region 1100 at the start of a shot. FIG. 10C schematically illustrates a positional relationship between the subject image, the pixel unit 902, and the active pixel region 1100 after shake has occurred during the shot and the image sensor 900 has carried out control for correcting the shake. In the following descriptions, a pixel located in an ith column and a jth row is expressed as a pixel 901($i,j$).

Assume that when shake arises in the state illustrated in FIG. 10B, the subject image moves upward by an amount equivalent to the pitch of one pixel, and to the right by an amount equivalent to the pitch of two pixels, resulting in the state illustrated in FIG. 10C. The shake detection/control unit 904 detects the move in the subject image caused by the shake on the basis of a change in the count values from the region of interest 1101, which are read out periodically by the readout circuit 903. The shake detection/control unit 904 then calculates a shift direction and a shift amount for correcting the shake. The shake detection/control unit 904 then generates the shift CLK and the selection signal so that the count value held by the counter 1001 at the current point in time is replaced with the count value held by the counter 1001 of the pixel located at the calculated shift direction and shift amount.

In the example illustrated in FIGS. 10B and 10C, the shake detection/control unit 904 carries out one shift in the upward direction and two shifts in the right direction. As a result, the count value held by the counter 1001 of the pixel 901($i,j$) is replaced with the count value held by the counter 1001 of the pixel 901($i+2,j-1$).

By shifting the count values in accordance with the direction and amount of shake in this manner, the count values from before the subject image has moved due to shake can continue to be counted after the movement. Accordingly, degradation in image quality caused by repeatedly executing shake correction can be suppressed.

Unlike the first embodiment, in which the shake correction is carried out to maintain the positional relationship between the subject image and the pixel unit 902 at the start of the shot, the present embodiment carries out shake correction by shifting the image to the position of the subject image after the movement. Accordingly, after the shooting period has ended, the signal processing circuit 905 may output the pixel signals after shifting those signals within a range that does not corrupt the image, so that the same positional relationship as that between the subject image and the pixel unit 902 at the start of the shot is achieved.

Driving operations for obtaining one frame's worth of image data from the image sensor 900 will be described next with reference to the timing chart illustrated in FIG. 11. Here, VD represents a timing control signal input to the timing control circuit 906 from the control unit 103, and expresses the timing of the start of obtaining the one frame's worth of the image. The timing control circuit 906 can output various control signals at predetermined timings on the basis of the obtainment start timing, for example. RES, EN, and OUT_1 to OUT_n are the same as in the first embodiment. However, OUT_i represents a signal connected to a pixel 901 in the row at the upper end of the region of interest 1101, and OUT_j represents a signal connected to a pixel 901 in the row at the lower end of the region of interest 1101.

CNT is an example of the count value of the counter 1001. The selection signal is input to the selection circuit 1002, and U, D, R, and L indicate the selection states of the count values in the counters 1001 adjacent to the top, bottom, right, and left, respectively. When the shift CLK is input with the selection signals in the U, D, L, or R states, the count value of the counter 1001 is shifted up, down, left, or right, respectively.

With respect to RES, EN, LATCH, the shift CLK, and the selection signal, common signals are input for all of the pixels 901 in the pixel unit 902.

Readout driving in which only OUT_i to OUT_j are sequentially set to H level corresponds to an operation of reading out only the pixel signals (count values) from the region of interest 1101 to the shake detection/control unit 904 in the image sensor 900. The readout of the region of interest 1101 differs from the normal readout of one frame, not only in that a lower number of the pixels 901 is read out, but also in that the read-out count values are not output to the exterior of the image sensor 900. This makes it possible to read out at high speeds, regardless of the speed of the external interface of the image sensor 900.

"Shake detection/control unit" indicates the timing at which the shake detection/control unit 904 calculates the shake amount, as well as the shift amount and shift direction for correcting the shake, on the basis of the count values read out from the region of interest 1101.

At time t1300, the control unit 103 sets VD to H level to start obtaining one frame's worth of an image.

At time t1301, the timing control circuit 906 sets RES to H level, which resets the count values of the counters 1001 in all the pixels 901.

At time t1302, the timing control circuit 906 sets EN to H level, which starts the counting of the pulse numbers by the counters 1001 in all the pixels 901. A pulse is produced in the output signal of a light-sensitive element 1000 each time a photon is incident thereon, and the count value CNT of the counter 1001 rises as a result.

At time t1303, the timing control circuit 906 sets OUT_i to OUT_j to H level sequentially in order to read out the count values from the region of interest 1101. As a result, the count values of the counters 1001 of the pixels 901 within the region of interest 1101 are input to the shake detection/control unit 904 via the readout circuit 903.

After all of the count values from the region of interest 1101 have been input to the shake detection/control unit 904, the shake detection/control unit 904 executes a shake detection process. The first time the count values are read out from the region of interest 1101, there are no count values that have been read out in the past, and thus the shake detection process need not be carried out. Thereafter, the same processing as that of t1303 is executed periodically.

At time t1304, the read out from the region of interest 1101 and the shake detection process that follows thereafter are executed, in the same manner as in time t1303. Here, assume that no shake has been detected.

Assume that the shake detection/control unit 904 has detected movement in the subject image caused by shake, from the count values of the region of interest 1101 read out at time t1305. The shake detection/control unit 904 calculates a shift amount and shift direction necessary for correcting the detected shake. Here, assume that upward movement by an amount equivalent to the pitch of one pixel, and rightward movement by an amount equivalent to the pitch of two pixels, have been calculated as the shift amount and shift direction for correcting the shake.

At time t1306, the shake detection/control unit 904 starts shake correction control (driving for shifting the count values) on the basis of the calculated shift amount and shift direction. First, the shake detection/control unit 904 notifies the timing control circuit 906 to temporarily stop the count operations. Upon receiving the notification from the shake detection/control unit 904, the timing control circuit 906 sets EN to L level and stops the operations of the counters 1001.

On the other hand, the shake detection/control unit 904 supplies the selection signal R to all of the pixels 901. As a result, the selection circuit 1002 in each pixel 901 selects the count value of the counter 1001 in the pixel 901 horizontally adjacent to the left. The shake detection/control unit 904 then outputs the shift CLK twice. The count values of all the counters 1001 within the pixel unit 902 are shifted two pixels horizontally to the right as a result.

Next, the shake detection/control unit 904 supplies the selection signal U to all of the pixels. As a result, the selection circuit 1002 in each pixel 901 selects the count value of the counter 1001 in the pixel 901 adjacent below. The shake detection/control unit 904 then outputs the shift CLK once. The count values of all the counters 1001 within the pixel unit 902 are shifted one pixel upward as a result. As a result of this series of shift driving, the count value CNT is replaced with the count value from a pixel one row below and two columns to the left. The shake detection/control unit 904 may notify the timing control circuit 906 once the shift driving has ended.

Then, at time t1307, the timing control circuit 906 returns EN to H level. As a result, the counters 1001 in the pixels 901 resume the counting operations.

Thereafter, the shake detection/control unit 904 once again detects shake, and at time t1308 to t1309, carries out the shake correction control (shift driving) in the same manner as in time t1306 to t1307. Here, assume that downward movement by an amount equivalent to the pitch of one pixel, and leftward movement by an amount equivalent to the pitch of two pixels, have been calculated as the shift amount and shift direction for correcting the shake.

The shake detection/control unit 904 outputs the shift CLK twice in a state where the selection signal L has been supplied, and then outputs the shift CLK once in a state where the selection signal D has been supplied. This series of shifts results in the count value CNT of the counter 1001 being replaced with the count value of the pixel one row above and two columns to the right.

At time t1310, the timing control circuit 906 sets EN to L level and stops the counting operations of the counters 1001 in order to end the shooting period (the exposure period).

From time t1311, the timing control circuit 906 sets the OUT_1 to OUT_n to H level in sequence. As a result, the count values of the counters 1001 are sequentially read out to the readout circuit 903 as pixel signals through the vertical signal line, from the pixels 901 in the nth row for which OUT_n has gone to H level. The read-out pixel signals are output to the exterior of the image sensor 900 through the signal processing circuit 905.

At time t1312, the pixel signals from all of the pixels 901 in the active pixel region 1100 are output by the image sensor 900, and the obtainment of one frame's worth of the image by the image sensor 900 ends.

The image sensor 900 counts the incident photons in the period from time t1302 to t1310, and outputs the resulting pixel signals. Strictly speaking, incident photons are not counted in the periods used for the shake correction control (the shift driving) (time t1306 to t1307 and time t1308 to t1309), but because these periods are extremely short compared to the exposure period, the influence thereof on the image can be ignored.

The present embodiment describes a configuration in which the values held by the counters can be moved (shifted) as a whole in a pixel unit in which pixels are arranged, each of the pixels including a light-sensitive element capable of detecting the incidence of single photons and a counter that counts the number of incident photons. The count values are shifted on the basis of a shift direction and a shift amount based on shake of the image sensor, and thus an image in which image shake caused by the shake has been corrected can be obtained. According to the configuration of the present embodiment as well, electronic shake correction can be realized without needing memory for storing images.

A/D conversion for obtaining digital values is not needed in the present embodiment either, and thus noise caused by quantization error in the A/D conversion does not arise. Furthermore, in the present embodiment, wiring with the four pixels adjacent in the up, down, left, and right directions is sufficient, regardless of the maximum shake amount that can be suppressed, which makes it possible to reduce the amount of wiring as compared to the first embodiment.

Although the present embodiment describes a configuration in which the image sensor is provided with a shake detection function, shake of the image sensor may be detected on the basis of a shake detection signal output by the shake detection unit 104 in the image capture apparatus, as described in the first embodiment. Furthermore, the first embodiment may be configured so that the image sensor is provided with a shake detection function, as in the second embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-051517, filed on Mar. 19, 2018, which is hereby incorporated by reference herein in its entirety.

What is claimed is:

1. An image sensor in which a plurality of pixels are arranged, each of the plurality of pixels including:
    a light-sensitive element that detects the incidence of single photons; and
    a counter that counts a pulse contained in a signal,
    wherein the image sensor further comprises a control unit that, on the basis of detected shake, switches a signal of the light-sensitive element supplied to the counter in a pixel, or replaces a count value of the counter of the pixel with a count value of the counter in another pixel.

2. The image sensor according to claim 1,
    wherein on the basis of the detected shake, the control unit switches the signal supplied to the counter between an output signal from the light-sensitive element in the pixel including that counter and an output signal from one of the light-sensitive elements in a plurality of other pixels.

3. The image sensor according to claim 2,
    wherein the control unit switches the signal supplied to the counter when an amount of movement in a subject image caused by the detected shake becomes equivalent to an arrangement interval of the plurality of pixels.

4. The image sensor according to claim 2,
    wherein the plurality of other pixels are pixels adjacent to the pixel a signal to which is subject to switch and adjacent in a horizontal direction, a vertical direction, or a 45° diagonal direction.

5. The image sensor according to claim 1,
    wherein the control unit replaces the count value of the counter with the count value of the counter in another pixel by shifting count values of the counters among pixels in accordance with a direction and amount of the detected shake.

6. The image sensor according to claim 5,
    wherein the control unit carries out the shift in the horizontal direction and the vertical direction.

7. The image sensor according to claim 1,
    wherein the control unit detects the shake on the basis of a signal supplied from the exterior.

8. The image sensor according to claim 7,
    wherein the signal supplied from the exterior is an output signal from an acceleration sensor.

9. The image sensor according to claim 1, further comprising:
    a readout unit that periodically reads out the count value of the counter in a pixel, among the plurality of pixels, located in a predetermined region,
    wherein the control unit detects the shake on the basis of the count value read out by the readout unit.

10. The image sensor according to claim 9,
    wherein the control unit detects the shake on the basis of a difference between count values read out at different times.

11. An electronic device that comprises an image sensor having a plurality of pixels are arranged, wherein each of the plurality of pixels including:
    a light-sensitive element that detects the incidence of single photons; and
    a counter that counts a pulse contained in a signal,
    wherein the image sensor further comprises a control unit that, on the basis of detected shake, switches a signal of the light-sensitive element supplied to the counter in a pixel, or replaces a count value of the counter of the pixel with a count value of the counter in another pixel.

* * * * *